United States Patent
Boariu et al.

(10) Patent No.: US 7,379,506 B2
(45) Date of Patent: May 27, 2008

(54) APPARATUS, AND ASSOCIATED METHOD, FOR ASSIGNING DATA TO TRANSMIT ANTENNAS OF A MULTIPLE TRANSMIT ANTENNA TRANSMITTER

(75) Inventors: Adrian Boariu, Irving, TX (US); Balaji Raghothaman, Allen, TX (US)

(73) Assignee: Nokia Corporation, Espoo (FI)

( * ) Notice: Subject to any disclaimer, the term of this patent is extended or adjusted under 35 U.S.C. 154(b) by 506 days.

(21) Appl. No.: 10/669,128

(22) Filed: Sep. 23, 2003

(65) Prior Publication Data

US 2005/0064908 A1 Mar. 24, 2005

(51) Int. Cl.
*H04B 7/02* (2006.01)

(52) U.S. Cl. ...................................... 375/267

(58) Field of Classification Search ................ 375/267, 375/265; 455/103; 370/320, 335, 342, 441
See application file for complete search history.

(56) References Cited

U.S. PATENT DOCUMENTS

| | | | | |
|---|---|---|---|---|
| 5,628,052 A * | 5/1997 | DeSantis et al. | .......... | 455/562.1 |
| 5,914,946 A * | 6/1999 | Avidor et al. | ................ | 370/336 |
| 5,982,327 A * | 11/1999 | Vook et al. | .................. | 342/380 |
| 6,144,652 A * | 11/2000 | Avidor et al. | ................ | 370/336 |
| 6,144,711 A * | 11/2000 | Raleigh et al. | ............. | 375/347 |
| 6,185,266 B1 * | 2/2001 | Kuchi et al. | ................. | 375/347 |
| 6,424,642 B1 * | 7/2002 | Schmidl et al. | ............. | 370/342 |
| 6,434,372 B1 * | 8/2002 | Neagley et al. | ............. | 455/106 |
| 6,515,978 B1 * | 2/2003 | Buehrer et al. | ............. | 370/342 |
| 6,518,920 B2 * | 2/2003 | Proctor et al. | ............. | 342/367 |
| 6,724,828 B1 * | 4/2004 | Dabak | ........................ | 375/267 |
| 6,741,658 B1 * | 5/2004 | Ionescu | ....................... | 375/267 |
| 6,785,341 B2 * | 8/2004 | Walton et al. | ............... | 375/267 |
| 6,851,083 B1 * | 2/2005 | Hagenauer et al. | ......... | 714/774 |
| 7,006,848 B2 * | 2/2006 | Ling et al. | ................ | 455/562.1 |
| 7,016,658 B2 * | 3/2006 | Kim et al. | .................. | 455/102 |
| 7,020,482 B2 * | 3/2006 | Medvedev et al. | ......... | 455/522 |
| 2001/0043584 A1 * | 11/2001 | Kersken et al. | ............. | 370/349 |
| 2001/0047424 A1 * | 11/2001 | Alastalo et al. | ............. | 709/236 |
| 2003/0072283 A1 * | 4/2003 | Varshney et al. | ........... | 370/335 |
| 2003/0076870 A1 * | 4/2003 | Moon et al. | ................ | 375/130 |
| 2003/0128769 A1 * | 7/2003 | Kim et al. | ................... | 375/265 |
| 2003/0148770 A1 * | 8/2003 | Das et al. | ................... | 455/455 |
| 2004/0165676 A1 * | 8/2004 | Krishnan et al. | ........... | 375/267 |

* cited by examiner

*Primary Examiner*—Don N Vo
(74) *Attorney, Agent, or Firm*—Alston & Bird, LLC

(57) ABSTRACT

Apparatus, and an associated method, for facilitating communication of encoded data, formed of a systematic part and a non-systematic part, in a radio communication system. Systematic parts of the encoded data are assigned by an assignor to transmit antennas that are associated with communication channels exhibiting better, or best, communication quality levels. Determinations are made of communication conditions to rank the transmit antennas, thereby permit appropriate assignments of the encoded data to transmit antennas. Feedback is provided by the receiver that receives the transmitted data. The feedback information includes, or is formed responsive to, detections and other measurements at the receivers.

24 Claims, 2 Drawing Sheets

APPARATUS, AND ASSOCIATED METHOD, FOR ASSIGNING DATA TO TRANSMIT ANTENNAS OF A MULTIPLE TRANSMIT ANTENNA TRANSMITTER

The present invention relates generally to a manner by which to facilitate communication of data at a multiple-antenna transmitter operable in a radio communication system. More particularly, the present invention relates to apparatus, and an associated method, by which to allocate data parts of encoded data to selected ones of the antenna transducers of the multiple-antenna transmitter.

Allocation is made responsive to determination of channel conditions of channels defined by individual ones of the transmit antennas. Systematic parts of the encoded data are allocated to one or more transmit antennas associated with channels that exhibit the best channel conditions. And, parity parts of the encoded data are allocated to a remaining one, or more, of the transmit antennas, associated with channels exhibiting relatively poorer channel conditions. Only a limited amount of feedback information is required to be communicated over a radio air interface to determine to which antenna transducers to assign the data to be transduced therefrom. And, by assigning systematic, encoded data to antenna transducers associated with channels that exhibit the best channel conditions, the informational content of the received data later received at a receiver is best able to be recovered.

BACKGROUND OF THE INVENTION

A communication system provides for the communication of data between communication stations, of which at least one of the communication stations forms a sending station and another of the communication stations forms a receiving station. The sending and receiving stations are interconnected by way of a communication channel upon which data, originated at, or otherwise provided to, the sending station is communicated to the receiving station.

A wide variety of different types of communication systems have been developed and deployed. And, such communication systems are regularly utilized to effectuate many different types of communication services. As a result of technological advancements, new types of communication systems have been developed and installed. Additional technological advancements shall likely permit the development and deployment of additional types of communication systems providing additional, and improved, communication services to be effectuated.

Radio communication systems are exemplary of communication systems that have benefited from technological advancements and of which infrastructures thereof have been deployed and regularly utilized through which to effectuate various types of communication services. Radio communication systems differ with conventional, wireline communication systems in that the communication channel that interconnects sending and receiving stations operable therein is defined upon a radio link extending between the communication stations. That is to say, a communication path extending between the sending and receiving stations of a radio communication system includes, along at least a portion thereof, a radio link upon which the communication channel is defined. A wireline connection is thereby obviated for the portion of the communication path that, instead, is defined upon the radio link.

Use of a radio communication system through which to communicate provides various advantages. The installation and deployment costs, for example, of a radio communication system are generally less than costs required to install and deploy a corresponding wireline communication system. And, a radio communication system can be implemented as a mobile communication system in which one, or more, of the communication stations operable therein are permitted mobility, forming, as a result, a mobile communication system.

Many modern radio communication systems make use of digital communication techniques. When digital communication techniques are used, data that is to be communicated is first placed into digitized form and then, typically, formatted into data packets or frames, according to a selected formatting scheme. Once formatted, the data is modulated and transduced into electromagnetic form for communication on the radio communication channel to a receiving station. Once delivered at the receiving station, the receiving station operates to demodulate the data and recreate the informational content thereof.

If the information is communicated in a distortion-free environment, the values of the data, when received at the receiving station identically correspond in value with the values of the data when transmitted by a sending station. But, because no communication system is distortion-free, the values of the data, when received at the receiving station differ with the corresponding values of the data when sent by the sending station. If the values differ significantly, the informational content of the data cannot be recreated at the receiving station.

Communication conditions on the radio communication channel adversely affect the communication of the data. For instance, multipath communication conditions cause the data to fade during its communication upon the radio communication channel. Multipath transmission conditions are sometimes referred to as fading conditions. Fading of the data alters the values of the data, or portions thereof, such that, when detected at the receiving station, the values of the data differ with corresponding values when sent by the sending station.

Various manners are used by which to attempt to compensate for the distortion caused by fading. For instance, by increasing the diversity of the data, the likelihood that the informational content of the data can be recovered at the receiving station is increased.

Time diversity, for instance, is one type of diversity that is sometimes utilized to compensate for the effects of fading. When time diversity is utilized, time redundancy is introduced into the data. By introducing time redundancy, loss of portions of the data during its communication upon a fading channel is less likely to prevent the informational content of the data to be recovered. Fading sometimes is time-variant. And, the increased redundancy permits the loss of portions of the data due to fading of such portions less likely to prevent recovery of the informational content of the data.

Space diversity is another type of diversity that is also sometimes increased also to compensate for the effects of fading. Space diversity, typically, refers to the utilization of more than one transmit antenna at a sending station at which to transduce data into electromagnetic form for communication to a receiving station. The antennas are separated by selected by selected separation distances to provide selected levels of correlation between the data transmitted at the separate ones of the antennas. The separation distances between the antennas are generally selected to ensure that the data communicated at the respective ones of the antennas achieve at least a selected level of uncorrelation so that fading occurs in uncorrelated manners.

Space diversity is also provided at a receiver through the use of multiple receive antennas, also spaced apart by selected separation distances.

Communication systems that utilize space diversity at both the transmitter, i.e., the sending station, and the receiving station, i.e., the receiver, are sometimes referred to as being a MIMO (multiple input, multiple output) communication system. The number of receive antennas in such a system is generally, albeit not necessarily, at least as great as the number of transmit antennas formed at the transmitter. Each transmit antenna and receive antenna pair defines a separate channel that exhibits different fading conditions. The level of fading exhibited on the different channels is sometimes significant, particularly when the separate transmit and separate receive antenna transducers are highly uncorrelated. That is to say, communication conditions on a channel defined by a particular transmit and receive antenna pair might well be relatively better than communication conditions on another of the channels defined by another of the transmit and receive antenna pair.

Multiple input, multiple output communication system also advantageously provide for relatively high throughput rates as separate data can be communicated upon the different channels defined by the different ones of the transmit antenna and receive antenna pairs. As radio communication systems, such as cellular communication systems increasingly are used to effectuate data intensive communication services, MIMO implementations shall increasingly be utilized. For instance, in a CDMA 2000 communication system that provides for 1xEV-DV communication services, high data rate communication services shall be provided.

Various proposals have been set forth for MIMO implementations for use in a CDMA 2000/1xEV-DV communication system. A so-called per antenna rate control (PARC) system has been proposed by which to communicate independent data streams, albeit encoded at different ones of the transmit antennas. In this proposed implementation, side information regarding channel strengths is provided. Based upon this information, a radio base station tailors a data rate and a modulation order for each transmit antenna.

If any additional manners could be provided by which to enhance the system capacity in an MIMO system, yet further improvements in the communication in data intensive communication services would be facilitated.

It is in light of this background information related to communications in a radio communication system having a transmitter that includes multiple transmit antennas that the significant improvements of the present invention have evolved.

SUMMARY OF THE INVENTION

The present invention, accordingly, advantageously provides apparatus, and an associated method, by which to facilitate communication of data at a multiple antenna transmitter operable in a radio communication system.

Through operation of an embodiment of the present invention, a manner is provided by which to allocate data parts of encoded data to selected ones of the antenna transducers of the multiple-antenna transmitter.

Determinations are made of channel conditions of channels defined, at least in part, by individual ones of the transmit antennas. The data is encoded, and selected encoded parts of the data are assigned to selected ones of the transmit antennas according to an ordering scheme in which the channels, and the transmit antennas associated therewith, are ranked in order of their channel quality levels.

Systematic parts of the encoded data are allocated to one or more of the transmit antennas associated with channels that exhibit relatively better channel conditions. And, parity parts of the encoded data are allocated to a remaining one or more of the transmit antennas that are associated with channels exhibiting relatively poorer channel conditions.

By allocating the channels exhibiting the better channel conditions for use to communicate the systematic, i.e., the informational content part, of the encoded data, the likelihood that the informational content of the data, once delivered to a receiver, is able to be recovered, is increased.

In one aspect of the present invention, indications of the channel conditions on each of the channels defined by the separate ones of the transmit antennas are provided to the transmitter. Responsive to the indications, determinations are made of the channel qualities exhibited by the different ones of the channels associated with the different ones of the transmit antennas. Data assignments are made by which to cause parts of the encoded data to be assigned to different ones of the transmit antennas depending upon the channel qualities of the channels associated with the transmit antennas. Systematic data is assigned to the transmit antennas that exhibit the better channel qualities. By communicating the informational part of the encoded data upon the channels that exhibit the better communication conditions, the likelihood that the systematic part of the data shall be delivered to the receiver in form permitting its recovery at the receiver is enhanced.

In another aspect of the present invention, detections are made at the receiver, such as a mobile station operable in a cellular radio communication system, of channel conditions upon the channels upon which data is communicated thereto. Detections are made, for instance, of the total channel energy detected at the mobile station of data communicated upon all channels to the mobile station. And, the detector also detects, or otherwise is provided with, information relating to an antenna index number. Detections made by the detector are formatted into a message, and the message is returned to the base station, i.e., the transmitter, pursuant to a feedback arrangement. The values contained in the message form the indications used to determine the channel quality levels of the channels. And, assignations to individual ones of the transmit antennas are made. Because only a limited amount of information is required to be returned to the transmitter, limited bandwidth is required for the communication of the feedback message.

Thereby, improved qualities of communication are effectuated, and only a small bandwidth allocation is required for the feedback of the information pursuant to a feedback arrangement.

In these and other aspects, therefore, apparatus, and an associated method, is provided for a radio communication system. The radio communication system has a multiple antenna transmitter that selectably transmits data, at least from a first transmit antenna transducer and at least a second transmit antenna transducer for communication to a receiver. The data is encoded at an encoder to include a systematic part and a non-systematic part. Transmission of the data to the receiver is facilitated. A determiner is at least adapted to receive indications of channel conditions of each channel upon which data is transmitted by each of the first and at least second transmit antenna transducers. The determiner determines at least relative channel qualities of each of the channels. A data assignor is coupled to the determiner to receive indications of determinations made thereat. The data assignor assigns the systematic part of the data encoded by the encoder to at least one of the first and at least second transmit antenna transducers that exhibits relatively better channel qualities.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
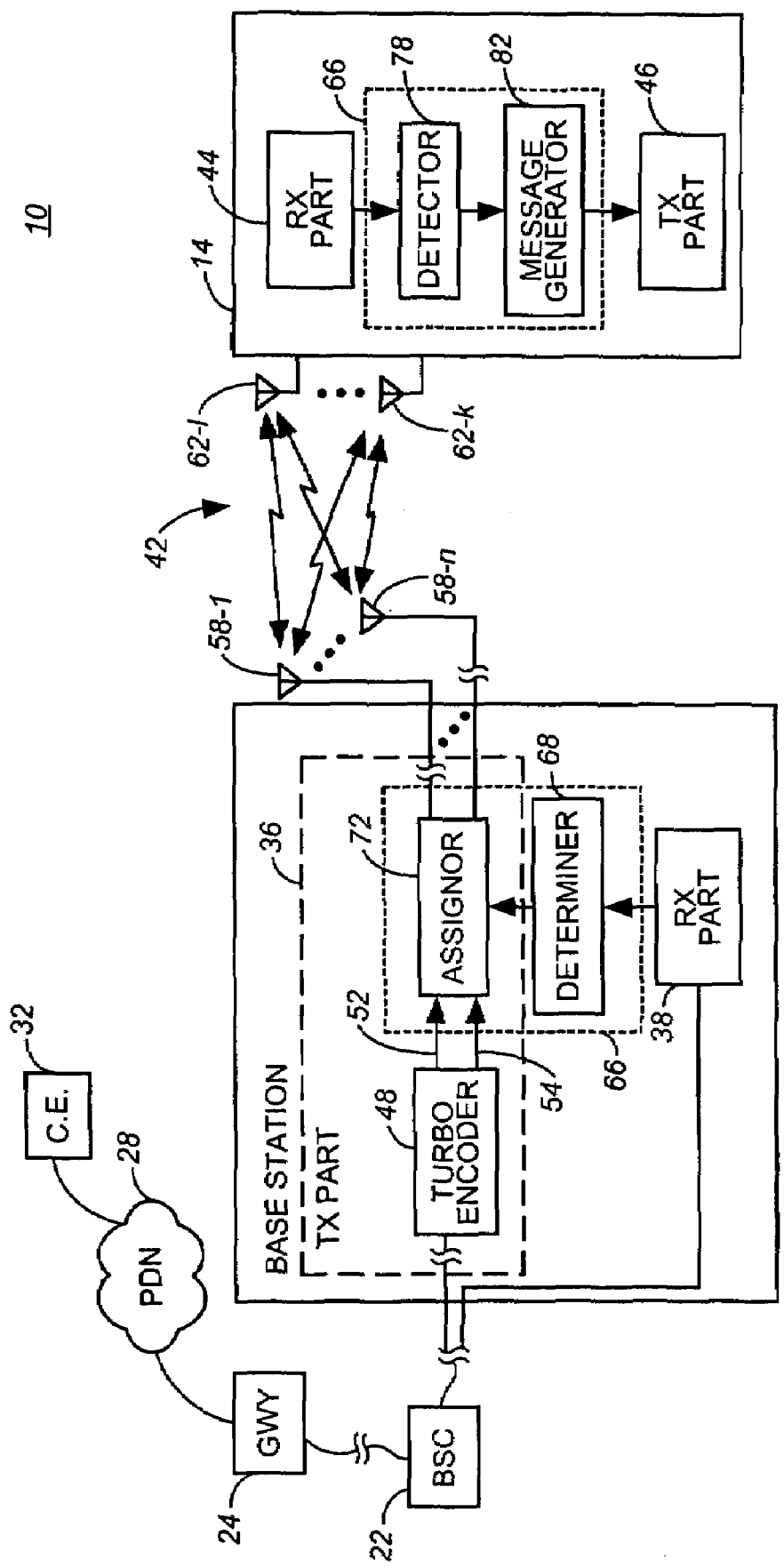
FIG. 1 illustrates a functional block diagram of a radio communication system in which an embodiment of the present invention is implemented.

Referring first to FIG. 1, potions of a radio communication system, shown generally at 10, provides for radio communication of data between radio communication stations, of which two radio communication stations, radio communication station 12 and radio communication station 14, are shown in FIG. 1.

In the exemplary implementation, the communication system forms a cellular communication system in which the communication station 12 forms a base station and the communication station 14 forms a mobile station. And, more particularly, in the exemplary implementation, the cellular communication system is representative of a CDMA 2000 cellular communication system that provides for 1xEV-DV data communications.

The communication system is also representative of other types of cellular communication systems, such as, e.g., a GSM (Global System for Mobile communications) system that provides for GPRS (General Packet Radio Service) or EDGE (Enhanced Data for GSM Evolution) data services, each of which also provides for data communications. The communication system is also representative of other types of radio, and other, communication systems in which data is communicated upon channels that are susceptible to distortion caused by fading, or other, conditions.

Accordingly, while the following description of exemplary operation of the communication system shall be described with respect to its implementation as a cellular communication system operable generally pursuant to the CDMA 2000/1xEV-DV operating specification, operation of an embodiment of the present invention is analogously implementable in other types of communication systems, and the operation of an embodiment of the present invention can be analogously described with respect to its implementation in such other communication system.

Additionally, the following description shall describe exemplary operation of an embodiment of the present invention with respect to communication of data sourced at the network part of the communication system for communication to the mobile station 14. Analogous description of operation of an embodiment of the present invention in which data is communicated by the mobile station to the base station is similar to, but in a direction reverse to that of, that described herein.

The base station 12 forms part of a radio access network part of the network infrastructure of the communication system. The base station is here shown to be coupled to a base station controller (BSC) 22. And, in turn, the base station controller is coupled to a radio gateway (GWY) 24.

The gateway forms a gateway to, and from, other portions of the network infrastructure of the communication system. The network infrastructure is further shown to include a packet data network (PDN) 28, such as the Internet backbone. A correspondent entity (CE) 32 is coupled to the packet data network and is representative of a data source or a data sink that originates, or terminates, data communicated during operation of the communication system.

The base station 12 includes a transmit part 36 and a receive part 38 that operate to transmit and to receive, respectively, data communicated by way of a radio air interface 42 with mobile stations, such as the mobile station 14. Similarly, the mobile station 14 forming the second communication station also includes receive and transmit parts, here receive part 44 and transmit part 46, also operable to transceive data during operation of the communication system. Data transmitted by the transmit part 36 of the base station is communicated upon forward link channels defined upon the radio air interface to be detected by the receive part 44 of the mobile station. And, data transmitted by the transmit part 46 of the mobile station is communicated upon reverse link channels defined upon the radio air interface to be detected by the receiver part 38 of the base station.

The transmit part of the base station includes a data encoder, here, e.g., a turbo encoder 48 that encodes data into encoded form, here to include a systematic and a non-systematic part. Generation of the systematic part by the encoder 48 is represented on the line 52, and generation of the non-systematic part of the encoded data is represented on the line 54. The systematic part is formed of systematic, i.e., informational bits, and the non-systematic part is formed of parity, or other, non-systematic bits.

The base station further includes multiple transmit antennas 58. Here, n transmit antennas are coupled to the transmit part 36 of the base station and operate to transduce into electromagnetic form the data applied thereto for communication upon forward link channels to the mobile station. And, in the exemplary implementation, the mobile station includes multiple receive antennas 62. Here, the mobile station includes k receive antennas. The receive antennas operate to detect the data communicated thereto by way of the radio air interface and to convert, out of electromagnetic form and into electrical form, representations of the detected data. Implemented as shown, the base station and mobile station together define a MIMO (multiple input, multiple output) communication system. Utilization of an MIMO advantageously permits for the effectuation of data intensive communication services as separate data can be communicated concurrently by separate ones of the transmit antennas.

Through appropriate spacings between the transmit antennas 58, the communication channels, i.e., paths, exhibit differing channel conditions. That is to say, through appropriate spacings of the transmit antennas, the communication channels are caused to be substantially uncorrelated, and different channels might well exhibit differing levels of fading. Different fading conditions on the different channels are sometimes significant, and the communication qualities of the different channels also correspondingly, in such occurrences, differ significantly. When different data is transduced by the different ones of the transmit antennas, therefore, distortion due to fading distorts the data communicated upon different communication paths in different manners. And, as the recovery of the informational content of such data at the mobile station is dependent upon the amount of distortion of the data during its communication, successful recovery of different data parts, communicated along the different communication paths correspondingly differs.

An embodiment of the present invention provides apparatus 66 that facilitates communication of the data by selectably assigning data parts of the encoded data to different ones of the transmit antennas 58. Selection and subsequent assignment of the data parts to the different ones of the transmit antennas is made responsive to the communication conditions upon the differing channels, i.e., communication paths, defined, at least in part, by the positioning of the transmit antennas 58. Pursuant to operation of the exemplary embodiment of the present invention, the systematic part of the data encoded by the encoder is assigned to transmit antennas associated with channels that exhibit the best communication qualities. The informational part of the encoded data is delivered to the mobile station in a manner best to permit the informational content of such portion to recreated thereat.

The apparatus 66 is here shown to be formed of functional entities implementable in any desired manner, such as by algorithms executable by processing circuitry.

The apparatus 66 here includes a determiner 68 and an assignor 72. The determiner 68 operates to determine, or otherwise rank, the communication channels or their associated transmit antennas based upon at least relative channel quality levels. Representations of the determinations are provided to the assignor, and the assignor, responsive thereto, assigns systematic parts of the encoded data to the transmit antennas associated with channels that exhibit the best, or better, communication quality levels. And, the assignor assigns the parity part of the encoded data to the remaining transmit antennas, i.e., the transmit antennas, or antennas, that are associated with poorer channel conditions. Upon assignment of the data parts to the respective transmit antennas, the data is routed to the assigned transmit antennas to be transduced therefrom.

In the exemplary implementation, the mobile station, i.e., the receiving station, also includes apparatus 66 of an embodiment of the present invention. The apparatus embodied at the mobile station also is formed of functional entities, implementable in any desired manner, again, for instance, by algorithms executable at processing circuitry. The apparatus here includes a detector 78 coupled to the receive antennas 62, here by way of the receive part 44 to receive indications of channel conditions of the channels upon which data is communicated to the mobile station. And, indications of such detections or other measurements, are provided to a message generator 82. The message generator operates to form a message that is provided to the transmit part 46 to be sent to the base station, pursuant to a feedback scheme, to report to the base station representations of the indications detected at the mobile station.

In the exemplary implementation, the detector detects energy levels of data received at each of the receive antennas 62, and an antenna index, identifying antennas or pairs 58-62 defining the best quality channel or channels, and such information is provided to the message generator. The detector, in a further implementation, also forms measurements of Et that is also communicated to the base station pursuant to a feedback scheme.

Mathematically, a channel matrix defines the channels defined between respective transmit and receive antenna pairs. The channel matrix is represented mathematically as follows:

$$H=[h_{ij}]_{K \times M} \tag{1}$$

where $h_{ij}$, $i=1,\ldots,K$, $j=1,\ldots,M$ is the corresponding channel between receive antenna i and transmit antenna j.

The channel energy due to the j-th transmit antenna is $$E_j=H(:,j)^H H(:,j), \tag{2}$$

where $H(:,j)$ denotes the j-th column of H, and H is the Hermitian operator. The total channel energy available at the receiver is $$E_t=tr(H^H H)=\Sigma_{j=1,\ldots,M} E_j \tag{3}$$

where tr(•) denotes the trace operation.

The value of $E_t$ together with antenna index values of selected antennas are returned to the base station pursuant to the feedback scheme.

Thereby, assignments made by the assignor 72 are made based upon actual measured indicia of communication quality levels and communication conditions on communication channels upon which data is actually communicated. By assigning systematic parts of the encoded data to transmit antennas associated with communication channels that exhibit the best quality levels, the informational content of the encoded data is best able to be communicated to, and the informational content thereof recovered at the mobile station. Because only a limited amount of feedback information is used to determine the assignments, the bandwidth required to be allocated to communicate the feedback message is minimal. Thereby, improved communication in the communication system that utilizes the multiple transmit antennas together with a data encoding scheme that forms systematic and non-systematic parts is provided.

Figure 2:
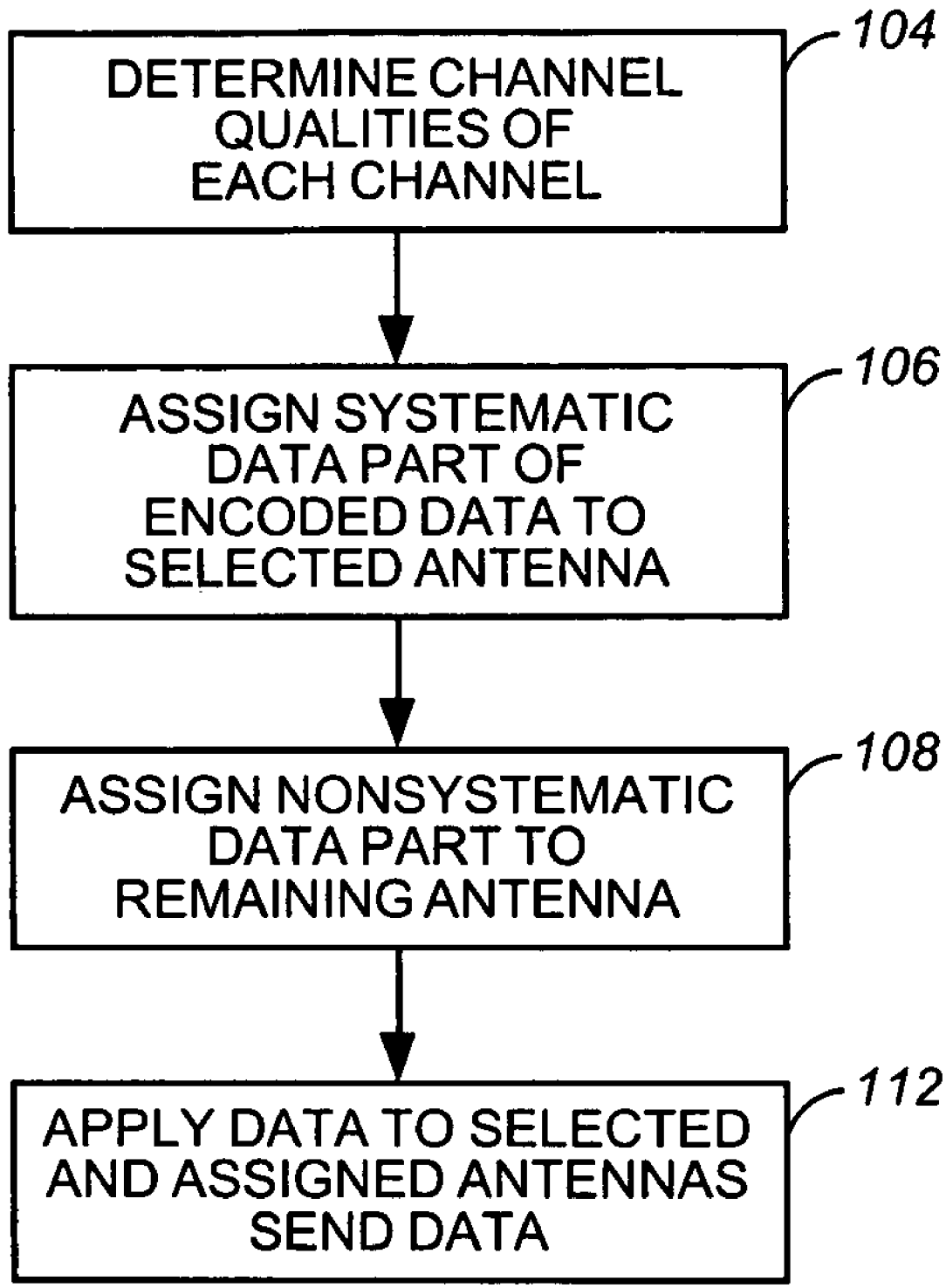
FIG. 2 illustrates a method flow diagram of the method of operation of an embodiment of the present invention.

FIG. 2 illustrates a method flow diagram, shown generally at 102, of the method of operation of an embodiment of the present invention. The method facilitates transmission of data to a receiver of a radio communication system that is transmitted by a multiple antenna transmitter that includes a first transmit antenna and at least a second transmit antenna. The data transmitted by the transmitter is encoded and includes a systematic part and a non-systematic part.

First, and as indicated by the block 104, at least relative channel qualities of each channel upon which data is transmitted by each of the first and at least second antenna transducers is determined.

Then, as indicated by the block 106, the systematic part of the data is assigned to at least one of the first and at least second transmit antenna transducers that exhibits relatively better channel qualities.

Additionally, and as indicated by the block 108, the non-systematic part of the data is assigned to a remaining one or more of the transmit antennas. Thereafter, and as indicated by the block 112, the systematic and non-systematic data is routed to the assigned transmit antennas, transduced into electromagnetic form and transmitted to the receiver.

Because the systematic part of the data is assigned to transmit antennas associated with channels exhibiting better communication quality levels, the likelihood that the informational content of the encoded data is able to be recovered, once delivered to the receiver, is maximized.

The previous descriptions are of preferred examples for implementing the invention, and the scope of the invention should not necessarily be limited by this description. The scope of the present invention is defined by the following claims.

We claim:

1. A radio communication system having a multiple-antenna transmitter that selectably transmits data at least from a first transmit antenna transducer and at least a second transmit antenna transducer for communication to a receiver, an apparatus comprising:

an encoder which encodes the data, the data encoded comprises a systematic part and a non-systematic part;

a determiner at least adapted to receive indications of channel conditions of each channel upon which data is transmitted by each of the first and at least second transmit antenna transducers, respectively, said determiner for determining at least relative channel qualities of each of the channels; and a data assignor coupled to said determiner to receive indications of determinations made thereat, said assignor for assigning the systematic part of the data encoded by the encoder to at least one of the first and at least second transmit antenna transducers that exhibits better channel qualities, wherein the indications of the channel conditions which said determiner is adapted to receive comprise indications of aggregated energy levels of the data detected at the receiver.

2. The apparatus of claim 1 wherein the radio communication system comprises a multiple-input, multiple-output communication system, wherein the receiver comprises a first receive antenna transducer and at least a second receive antenna transducer, and wherein said determiner is at least adapted to receive indications of channel conditions on each channel formed between each of the first and at least second transmit antenna transducers and each of the first and at least second receive antenna transducers.

3. The apparatus of claim 1 wherein the indications of the channel conditions to which said determiner is adapted to receive are provided to the transmitter by the receiver.

4. The apparatus of claim 1 wherein the encoder at which the data is encoded to include the systematic part comprises a turbo encoder.

5. The apparatus of claim 1 wherein the non-systematic part of the data encoded by the encoder comprises a parity part and wherein said data assignor further assigns the parity part of the data encoded by the encoder to at least an other of the at least one of the first and at least second transmit antenna transducers.

6. The apparatus of claim 5 wherein the other of the at least one of the first and at least second transmit antenna transducers to which said data assignor assigns the parity part of the data encoded by the data encoder exhibits poorer channel qualities.

7. The apparatus of claim 6 wherein said data assignor assigns the systematic part to a selected number of the first and at least second transmit antenna transducers that exhibit the better channel qualities and assigns the parity part to at least one remaining transmit antenna transducer.

8. The apparatus of claim 1 wherein the radio communication system comprises a cellular communication system operable pursuant to a cdma 2000 operating specification and that provides for 1xEV-DV data communications and wherein the data encoded by the data encoder comprises 1xEV-DV data, the data assigned by said data assignor and transmitted from the first and at least second antenna transducers pursuant to effectuation of a 1xEV-DV data communication service.

9. The apparatus of claim 1 wherein the indications of the channel conditions to which said determiner is coupled to receive comprise antenna index values.

10. The apparatus of claim 9, wherein the antenna index values comprise data identifying a best channel quality of a channel between a respective one of one or more transmit and receive antennas pairs.

11. The apparatus of claim 9, wherein the antenna index values comprise data which ranks, from highest to lowest, the channel quality of each of the respective channels between one or more transmit and receive antenna pairs.

12. In the radio communication system of claim 1 wherein said determiner and said data assignor are embodied at the transmitter, a further improvement of apparatus for the receiver, also for facilitating transmission of the data to the receiver, said apparatus comprising:

a channel condition detector for detecting the channel conditions of each of the channels upon which the data is transmitted; and a channel condition message generator, coupled to said channel condition detector, said channel condition message generator for generating channel condition message for communication by the receiver to the transmitter of detections made by said channel condition detector.

13. The apparatus of claim 12 wherein the channel conditions detected by said channel condition detector comprise indications of aggregated energy levels detected at the receiver.

14. The apparatus of claim 12 wherein the channel conditions detected by said channel condition detector comprise indications of antenna index values.

15. The apparatus of claim 12 wherein the transmitter at which said determiner and said data assignor are embodied comprise a base transceiver station operable in a cellular radio communication system and wherein the receiver at which said channel condition detector and said channel condition message generator are embodied at a mobile station operable in the cellular radio communication system.

16. The apparatus of claim 1, wherein the aggregated energy levels comprise a total channel energy of the data communicated upon each of the channels to the receiver.

17. A method of communicating in a radio communication system having a multiple-antenna transmitter that selectably transmits data at least from a first transmit antenna transducer and at least a second transmit antenna transducer for communication to a receiver, the method comprising:

encoding the data, the encoded data comprises a systematic part and a nonsystematic part;

detecting channel conditions of each channel upon which the data is transmitted;

determining at least relative channel qualities of each channel upon which data is transmitted by each of the first and at least second transmit antenna transducers, responsive to detections made during the detecting; and assigning the systematic part of the encoded data to at least one of the first and at least second transmit antenna transducers that exhibits better channel qualities, wherein the detections comprise aggregate energy levels of the data received at the receiver.

18. The method of claim 17 wherein said operations of determining and assigning are performed at the transmitter and wherein said operation of detecting is performed at the receiver.

19. The method of claim 18 further comprising the operation of sending values representative of the channel conditions to the transmitter.

20. The method of claim 19 further comprising the operation, prior to said operation of sending, of forming a message containing the values representative of the channel conditions and wherein said operation of sending comprises sending the message formed during said operation of forming.

21. The method of claim 17, wherein the aggregate energy levels comprise a total energy level of the data communicated upon each of the channels to the receiver.

22. The method of claim 17, wherein detecting channel conditions further comprises detecting antenna index values.

23. The method of claim 22, wherein the antenna index values comprise data identifying a best channel quality of a channel between a respective one of one or more transmit and receive antennas pairs.

24. The method of claim 22, wherein the antenna index values comprise data which ranks, from highest to lowest, the channel quality of each of the respective channels between one or more transmit and receive antenna pairs.

* * * * *